United States Patent
Peng (10) Patent No.: US 12,206,299 B2
(45) Date of Patent: Jan. 21, 2025

(54) METHOD FOR ASSEMBLING LARGE-DIAMETER ELECTRIC MOTOR

(71) Applicant: BEIJING GOLDWIND SCIENCE & CREATION WINDPOWER EQUIPMENT CO., LTD., Beijing (CN)

(72) Inventor: Liang Peng, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 573 days.

(21) Appl. No.: 17/613,614

(22) PCT Filed: Jan. 19, 2020

(86) PCT No.: PCT/CN2020/072999
§ 371 (c)(1),
(2) Date: Nov. 23, 2021

(87) PCT Pub. No.: WO2020/233164
PCT Pub. Date: Nov. 26, 2020

(65) Prior Publication Data
US 2022/0239205 A1 Jul. 28, 2022

(30) Foreign Application Priority Data
May 23, 2019 (CN) .......................... 201910436358.1

(51) Int. Cl.
H02K 15/03 (2006.01)
H02K 1/14 (2006.01)
(Continued)

(52) U.S. Cl.
CPC ............. *H02K 15/03* (2013.01); *H02K 1/148* (2013.01); *H02K 1/2791* (2022.01); *H02K 7/1838* (2013.01); *H02K 2201/15* (2013.01)

(58) Field of Classification Search
CPC ...... H02K 15/03; H02K 1/148; H02K 1/2791; H02K 7/1838; H02K 1/27915;
(Continued)

(56) References Cited

U.S. PATENT DOCUMENTS

| 7,431,567 | B1 | 10/2008 | Bevington et al. |
| 7,573,168 | B2 * | 8/2009 | Carl, Jr. ................. H02K 1/276 |
| | | | 310/156.19 |
| 8,089,175 | B2 * | 1/2012 | Stiesdal .................... F03D 9/25 |
| | | | 290/55 |

(Continued)

FOREIGN PATENT DOCUMENTS

| CN | 101447703 A | 6/2009 |
| CN | 102695875 A | 9/2012 |

(Continued)

OTHER PUBLICATIONS

Australian Examination Report No. 2 for Appln. No. 2020277348 dated Apr. 3, 2023.
(Continued)

*Primary Examiner* — Donghai D Nguyen (57) ABSTRACT

The present disclosure relates to a method for assembling a large-diameter electric motor, the method includes: a preparing step: providing two or more stator segments for forming a stator and two or more rotor support segments for forming a rotor support; a splicing step: splicing the two or more stator segments and the two or more rotor support segments in a predetermined manner to form the stator and the rotor support that are coaxially assembled, respectively, and maintaining a predetermined gap between the stator and the rotor support in a radial direction; and an assembling step: inserting a plurality of magnetic pole modules into the (Continued)

predetermined gap, and assembling the plurality of magnetic pole modules to a mounting surface of the rotor support.

9 Claims, 5 Drawing Sheets

(51) Int. Cl.
*H02K 1/2791* (2022.01)
*H02K 7/18* (2006.01)

(58) Field of Classification Search
CPC .............. H02K 15/00; H02K 2201/15; H02K 2201/03; H02K 2213/12; Y10T 29/49009; Y10T 29/49012
See application file for complete search history.

(56) References Cited

U.S. PATENT DOCUMENTS

| | | | |
|---|---|---|---|
| 9,476,404 B2 * | 10/2016 | Feher | H02K 15/02 |
| 9,825,507 B2 * | 11/2017 | Muñiz Casais | F03D 9/25 |
| 2009/0026771 A1 | 1/2009 | Bevington et al. | |
| 2014/0028138 A1 | 1/2014 | Feher et al. | |
| 2014/0084593 A1 | 3/2014 | Muniz Casais et al. | |

FOREIGN PATENT DOCUMENTS

| | | |
|---|---|---|
| CN | 101521414 B | 1/2013 |
| CN | 102474166 A | 5/2015 |
| CN | 103547794 B | 4/2016 |
| CN | 108711966 A | 10/2018 |
| CN | 208174385 U | 11/2018 |
| DE | 102012218795 A1 | 5/2013 |
| EP | 1777795 A2 | 4/2007 |
| EP | 2063116 A1 | 5/2009 |
| EP | 2 555 393 B1 | 11/2013 |
| EP | 2731232 A1 | 5/2014 |
| EP | 2494682 B1 | 8/2017 |

OTHER PUBLICATIONS

European Office Communication rejecting claims dated Mar. 10, 2023; Appln. 20 809 325.2.
EPO Second Office Action dated Aug. 30, 2023; Appln. No. 20809325.2.
The First Chinese Office Action dated Jan. 26, 2022; Appln. No. 201910436358.1.
The Extended European Search Report dated May 18, 2022; Appln. No. 20809325.2.
The First Indian Office Action dated May 23, 2022; Appln. No. 202117055237.
The International Search Report mailed Apr. 15, 2020; PCT/CN2020/072999.
Australian Examination Report No. 1; Appln. No. 2020277348; dated Sep. 16, 2022.
Second Chinese Office Action dated Sep. 2, 2022; Appln. No. 201910436338.1.

* cited by examiner

METHOD FOR ASSEMBLING LARGE-DIAMETER ELECTRIC MOTOR

CROSS REFERENCE TO RELATED APPLICATION

This application is a National Stage of International Application No. PCT/CN2020/072999, filed on Jan. 19, 2020, which claims priority to Chinese Patent Application No. 201910436358.1, filed on May 23, 2019, both of which are hereby incorporated by reference in their entireties.

TECHNICAL FIELD

The present disclosure relates to a technical filed of electric motors, and particularly relates to a method for assembling a large-diameter electric motor.

BACKGROUND

As a single-machine power of a wind-power electric generator set becomes larger and larger, an outer diameter of an electric motor becomes larger and larger. If the outer diameter of the large-diameter electric motor is greater than 5 m, it will exceed the road transportation limiting value; if a dimension of the outer diameter is larger than 4.2 m, the transportation cost will increase sharply, which will bring great challenges to the land transportation.

At present, the effective solution is usually to divide the large-diameter electric motor into two or more electric motor separating portions in the circumferential direction, and after the electric motor separating portions are all transported to a site, the electric motor separating portions are assembled into a whole electric motor on the site. However, there is a large magnetic pulling force at an air gap between a stator and a rotor of the large-diameter electric motor, resulting in increasing the complexity of an assembling process.

SUMMARY

The object of the present disclosure is to provide a method for assembling a large-diameter electric motor; the method can avoid the influence of a magnetic pulling force at an air gap between a stator and a rotor on an assembling process.

Thus, the method for assembling the large-diameter electric motor is provided by the present disclosure; the method includes: a preparing step: providing two or more stator segments for forming the stator and two or more rotor support segments for forming a rotor support; a splicing step: splicing the two or more stator segments and the two or more rotor support segments in a predetermined manner to form the stator and the rotor support that are coaxially assembled, respectively, and maintaining a predetermined gap between the stator and the rotor support in a radial direction; and an assembling step: inserting a plurality of magnetic pole modules into the predetermined gap, and assembling the plurality of magnetic pole modules to a mounting surface of the rotor support.

The method for assembling the large-diameter electric motor is provided by the present disclosure. After two or more stator segments and two or more rotor support segments assembled into the complete stator and the complete rotor support respectively and a predetermined gap is maintained between the stator and the rotor support in the radial direction, the plurality of magnetic pole modules are assembled to the mounting surface of the rotor support through the predetermined gap, so that the influence of the magnetic pulling force at the air gap between the stator and a rotor on an assembling process can be avoided, and the convenience of assembling the large-diameter electric motor can be improved.

BRIEF DESCRIPTION OF THE DRAWINGS

The present disclosure can be better understood from the following description of the specific embodiments of the present disclosure in conjunction with the drawings; herein, by reading the following detailed description of the non-limiting embodiments with reference to the drawings, other features, objects, and advantages of the present disclosure will become more apparent, and the same or similar reference signs indicate the same or similar features.

In the drawings:
1—stator; 2—rotor support; 3—magnetic pole module; 31—base plate; 32—magnetic steel; 311—connecting portion; 2a—mounting surface; 4—main shaft; 41—fixing shaft; 411—first outer flange plate; 42—rotating shaft; 421—second outer flange plate; 43—bearing; 5—pressing strip; 6—fastening member; 7—fixing member;
10—stator segment; 20—rotor support segment.

DETAILED DESCRIPTION

The features and exemplary embodiments of various aspects of the present disclosure will be described in detail below. Many specific details are disclosed in the following detailed description in order to fully understand the present disclosure. However, it is obvious to those skilled in the art that the present disclosure can be implemented without some of these specific details. The following description of the embodiments is merely to provide a better understanding of the present disclosure by showing examples of the present disclosure. The present disclosure is by no means limited to any specific configurations and algorithms proposed below, but covers any modification, replacement and improvement of elements, member and algorithms without departing from the spirit of the present disclosure. In the drawings and the following description, well-known structures and technologies are not shown in order to avoid unnecessary obscurity of the present disclosure.

In order to better understand the present disclosure, a method for assembling a large-diameter electric motor provided by some embodiments of the present disclosure will be described in detail below in conjunction with FIG. 1 to FIG. 9.

Figure 1:
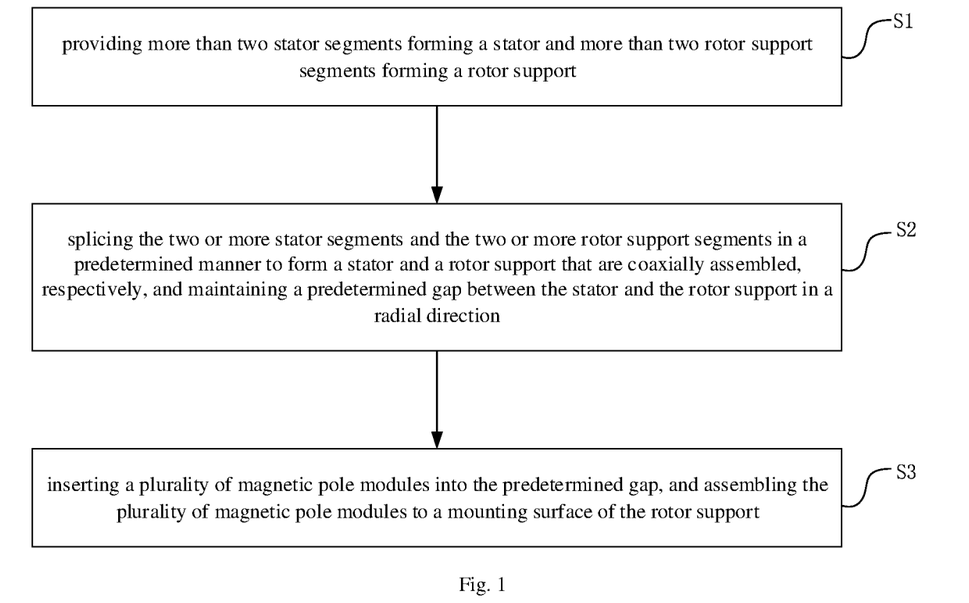
FIG. 1 shows a flowchart of a method for assembling a large-diameter electric motor according to an embodiment of the present disclosure.
Figure 2:
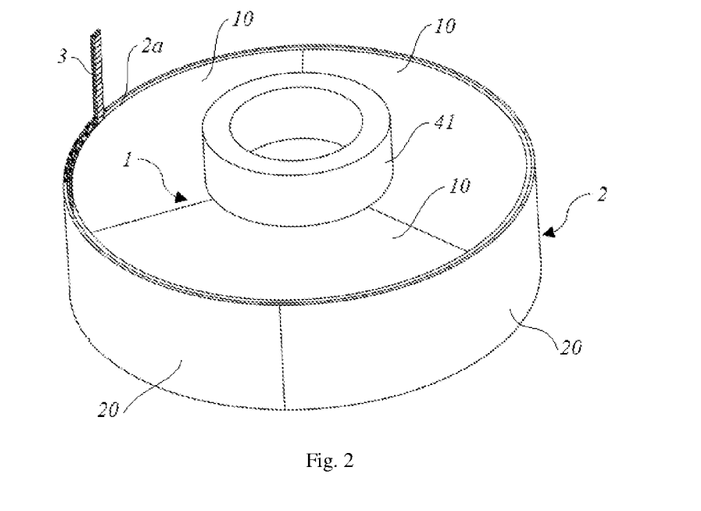
FIG. 2 shows a schematic structural view of the large-diameter electric motor in the method for assembling the large-diameter electric motor shown in FIG. 1.

Referring to FIG. 1 and FIG. 2 together, the method for assembling the large-diameter electric motor is provided by some embodiments of the present disclosure; the method includes a preparing step S1: providing two or more stator segments 10 for forming a stator 1 and two or more rotor support segments 20 for forming a rotor support 1;
in which the stator 1 is divided into two or more stator segments 10, and the rotor support 2 is divided into two or more rotor support segments 20, so that each of a dimension of a maximum chord length of each of the stator segments 10 and a dimension of a maximum chord length of each of the rotor support segments 20 is smaller than a road transportation limiting value, so that it is convenient for transportation; in addition, the number of the stator segments 10 may be the same as or different from the number of the rotor support segments 20; for example, three stator segments 10 form the complete stator 1, and two rotor support segments 20 form the complete rotor support 2;
a splicing step S2: splicing the two or more stator segments 10 and the two or more rotor support segments in a predetermined manner to form the stator 1 and the rotor support 2 that are coaxially assembled, respectively, and maintaining a predetermined gap between the stator 1 and the rotor support 2 in a radial direction; in which the large-diameter electric motor can have a structure with an inner stator and an outer rotor, or a structure with an outer stator and an inner rotor; and
an assembling step S3: inserting a plurality of magnetic pole modules 3 into the predetermined gap, and assembling the plurality of magnetic pole modules 3 to a mounting surface 2a of the rotor support 2;
in which after the magnetic pole modules 3 are mounted on the mounting surface 2a of the rotor support 2, the rotor can be formed; at this time, since the predetermined gap has been maintained between the stator 1 and the rotor support 2 in the radial direction, during the process of assembling the magnetic pole modules 3 to the mounting surface 2a of the rotor support 2, a magnetic pulling force of the magnetic pole modules 3 will not affect a radial distance between the stator 1 and the rotor support 2, thereby increasing the uniformity of an air gap between the magnetic pole modules 3 of the stator 1 and a rotor.

In the method for assembling the large-diameter electric motor provided by the embodiments of the present disclosure, since two or more stator segments 10 and two or more rotor support segments 20 are assembled into the complete stator 1 and the complete rotor support 2 respectively after transported to a site, and the predetermined gap is maintained between the stator and the rotor support in the radial direction, the plurality of magnetic pole modules 3 are inserted into the predetermined gap and assembled to the mounting surface of the rotor support, so that the influence of the magnetic pulling force at the air gap between the stator 1 and the rotor on an assembling process can be avoided, and the convenience of assembling the large-diameter electric motor on site can be improved.

A specific process of the method for assembling the large-diameter electric motor provided by the embodiments of the present disclosure will be described in detail below in conjunction with the drawings.

As an optional embodiment, the method for assembling the large-diameter electric motor provided by the embodiments of the present disclosure further includes:

step S01: dividing the stator 1 into two or more stator segments 10 in a circumferential direction;
in which the large-diameter stator 1 can be cut into two or more stator segments 10 by means of laser cutting or the like after being manufactured in a processing site, so that the dimension of the maximum chord length of each of the stator segments 10 is smaller than the road transportation limiting value, so that it is convenient for transportation; two or more stator segments 10 are transported from the processing site to an assembling site by means of transportation tools; and
step S02: dividing the rotor support 2 into two or more rotor support segments 20 in the circumferential direction;
in which the large-diameter rotor support 2 can be cut into two or more rotor support segments 20 by means of laser cutting or the like after being manufactured in the processing site, so that the dimension of the maximum chord length of each of the rotor support segments 20 is smaller than the road transportation limiting value, so that it is convenient for transportation; two or more rotor support segments 20 are transported from the processing site to the assembling site by means of transportation tools.

Herein, the number of the stator segments 10 and the number of the rotor support segments 20 may be the same or different.

It can be understood that an order of executing step S01 and step S02 is in no particular order, and can also be performed synchronously.

Further, in the splicing step S2, the splicing the two or more stator segments 10 and the two or more rotor support segments 20 in the predetermined manner to form the stator 1 and the rotor support 2 that are coaxially assembled respectively includes step S21: assembling two or more stator segments 10 into the complete stator 1 in the circumferential direction;
in which each of the stator segments 10 has an arc-shaped structure; each of stator segments 10 can be provided with positioning pins or positioning holes on end faces at two ends in the circumferential direction respectively; the positioning holes or the positioning pins are correspondingly arranged on the end faces of the two adjacent stator segments 10 in the circumferential direction, and two or more stator segments 10 can be positioned in the circumferential direction through the cooperation of the positioning holes and the positioning pins; in addition, positioning members can be arranged on the end faces of the two adjacent stator segments 10 in an axial direction, and the two adjacent stator segments 10 can be fixed as a whole in the circumferential direction by the positioning members, thereby assembling the complete stator 1;
step S22: assembling two or more rotor support segments 20 into the complete rotor support 2 in the circumferential direction;
in which, similar to the stator segments 10, each of the rotor support segments 20 has the arc-shaped structure; each of rotor support segments 20 can be provided with positioning pins or positioning holes on end faces at two ends in the circumferential direction respectively; the positioning holes or the positioning pins are correspondingly arranged on the end faces of the two adjacent rotor support segments 20 in the circumferential direction, and two or more rotor support segments 20 can be positioned in the circumferential direction through the cooperation of the positioning holes and the positioning pins; in addition, positioning members can be arranged on the end faces of the two adjacent rotor support segments 20 in the axial direction, and the two adjacent stator segments 10 can be fixed as a whole in the circumferential direction by the positioning members, thereby assembling the complete rotor support 2; and step S23: assembling the stator 1 and the rotor support 2 coaxially;

in which the rotor support 2 can sleeve at an outer peripheral side of the stator 1, or the stator 1 can sleeve on an outer peripheral side of the rotor support 2.

In addition, since there may be a gap between two adjacent rotor support segments 20 or between two adjacent stator segments 10 in the circumferential direction due to assembly errors, an elastic sealing member, such as an O-shaped ring sealing member or the like, can be placed in the gap.

It can be understood that an order of executing step S21 and step S22 is in no particular order, and can also be performed synchronously.

Figure 3:
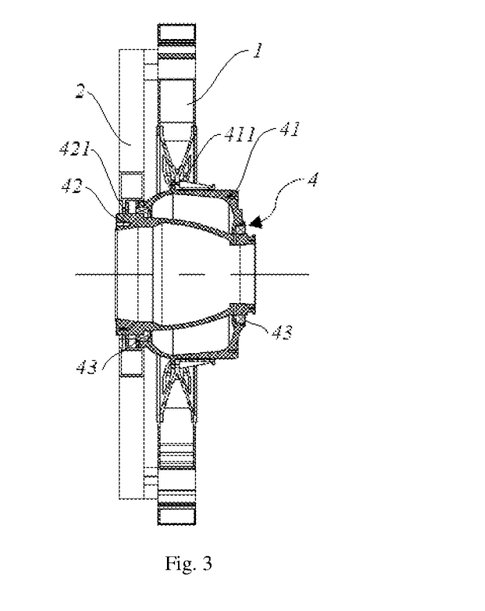
FIG. 3 shows a longitudinal-section schematic structural view of the large-diameter electric motor shown in FIG. 2.

Referring to FIG. 3, in the step S23, the assembling the stator 1 and the rotor support 2 coaxially includes step S231: providing a main shaft 4, in which the main shaft 4 includes a fixing shaft 41 and a rotating shaft 42 that are arranged coaxially, and a bearing 43 arranged between the fixing shaft 41 and the rotating shaft 42; herein, the rotating shaft 42 may sleeve on an outer peripheral side of the fixing shaft 41, or the fixing shaft 41 may sleeve on an outer peripheral side of the rotating shaft 42, depending on the specific application occasion;

the fixing shaft 41 and the rotating shaft 42 are usually made of a steel material, such as a low carbon steel, a ductile iron or the like, by a forming process, such as welding, casting or the like, and then by a machining process; by fixing components of the bearing 43, such as a bearing retainer ring and the like, the rotating shaft 42 cannot move in the axial direction relative to the fixing shaft 41, but can rotate.

step S232: fixing the stator 1 to the fixing shaft 41;

in which a first outer flange plate 411 is arranged at the outer circumference of the fixing shaft 41, and a first inner flange plate (not shown in the drawings) is arranged at an inner circumference of the stator 1; the fixing shaft 41 is extended into the inner circumference of the stator 1 in the axial direction, and the first outer flange plate 411 and the first inner flange plate are assembled into an integral body by a fastening member, so as to fix the stator 1 to the fixing shaft 41; and step S233: fixing the rotor support 2 to the rotating shaft 42 so that the rotor support 2 sleeves on the outer peripheral side of the stator 1, or the stator 1 sleeves on the outer peripheral side of the rotor support 2;

in which taking the rotating shaft 42 sleeving on the outer peripheral side of the fixing shaft 41 as an example, a second outer flange plate 421 is arranged at the outer circumference of the rotating shaft 42, a second inner flange plate (not shown in the drawings) is arranged at an inner circumference of the rotor support 2, the rotating shaft 42 is extended into the inner circumference of the rotor support 2 in the axial direction, and the second outer flange plate 421 and the second inner flange plate are assembled into an integral body by the fastening member, so as to fix the rotor support 2 to the rotating shaft 42.

As an optional embodiment, the method for assembling the large-diameter electric motor provided by the embodiment of the present disclosure further includes step S01: dividing the stator 1 into two or more stator segments 10 in the circumferential direction;

step S02: dividing the rotor support 2 into two or more rotor support segments 20 in the circumferential direction; and step S03: coaxially assembling the stator segments 10 and the rotor support segments 20 into pre-assembled modules 100.

Optionally, the number of the stator segments 10 is the same as the number of the rotor support segments 20, and an arc degree of the stator segments 10 and an arc degree of rotor support segments 20 are the same. Since the magnetic pole modules 3 are not included in the rotor support segments 20, the assembling process of the pre-assembled modules 100 will not be affected by the magnetic pulling force between the magnetic pole modules 3 and the stator segments 10. A dimension of a maximum chord length of each of the pre-assembled modules 100 is smaller than the road transportation limiting value, so that it is convenient for transportation from the processing site to the assembling site by means of transportation tools.

Figure 4:
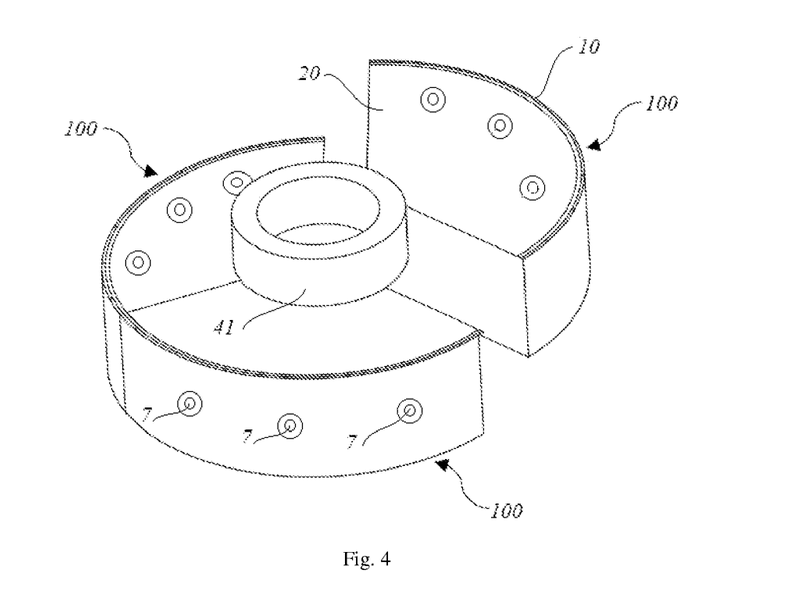
FIG. 4 shows a schematic structural view of another large-diameter electric motor in the method for assembling the large-diameter electric motor shown in FIG. 1.
Figure 5:
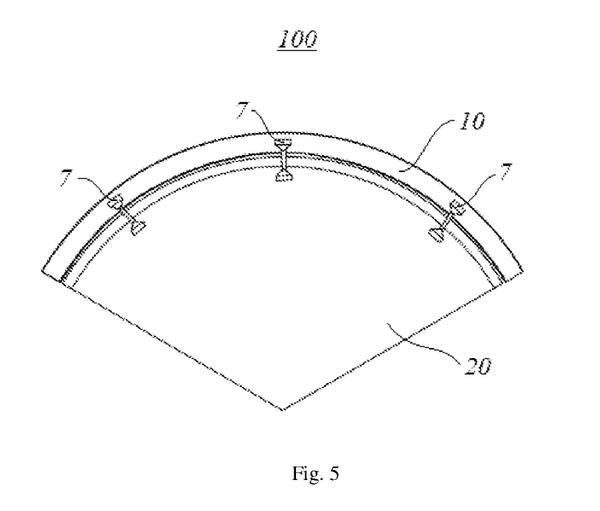
FIG. 5 shows a schematic top view of a pre-assembled module in the large-diameter electric motor shown in FIG. 4.

Referring to FIG. 4 and FIG. 5 together, in the splicing step S2, the splicing the two or more stator segments 10 and the two or more rotor support segments 20 in the predetermined manner to form the stator 1 and the rotor support 2 that are coaxially assembled respectively includes step S21': coaxially assembling the stator segments 10 and the rotor support segments 20 into the pre-assembled modules 100 by the fixing members 7, in which a predetermined gap is maintained between the stator segments 10 and the rotor support segments 20 in the pre-assembled modules 100 in the radial direction;

as shown in FIG. 4 and FIG. 5, the large-diameter electric motor has the structure with the inner stator and the outer rotor, each of the number of the stator segments 10 and the number of the rotor support segments 20 is 3, the rotor support segments 20 and the stator segments 10 are assembled in pairs to form the pre-assembled modules 100, and at least two fixing members 7 pass through the rotor support segments 20 and the stator segments 10 in the radial direction, respectively, so that the fixing members 7 can not only maintain the predetermined gap between the rotor support segments 20 and the stator segments 10 in the radial direction, but also ensure the safety of transportation;

step S22': assembling two or more pre-assembled modules 100 in the circumferential direction into the stator 1 and the rotor support 2 that are coaxially assembled; and step S23': removing the fixing members 7 in the pre-assembled module 100.

The pre-assembled module 100 can preset the predetermined gap in the radial direction between the rotor support segments 20 and the stator segments 10 at the processing site; after two or more pre-assembled modules 100 are assembled in the circumferential direction and then the fixing members 7 are removed, and the predetermined gap can be maintained to be unchanged, thereby ensuring that the air gap between the magnetic pole modules 3 and the stator 1 can be maintained to be unchanged.

Further referring to FIG. 3, in the step S22', the assembling two or more pre-assembled modules 100 in the circumferential direction includes step S221': providing the main shaft 4, in which the main shaft 4 includes the fixing shaft 41 and the rotating shaft 42 that are arranged coaxially, and the bearing 43 arranged between the fixing shaft 41 and the rotating shaft 42;

step S222': fixing the stator segments 10 of two or more pre-assembled modules 100 to the fixing shaft 41 in the circumferential direction;

in which the first outer flange plate 411 is arranged at the outer circumference of the fixing shaft 41, and two or more stator segments 10 are fixed to the first outer flange plate 411 in the circumferential direction to form the complete stator 1; and step S223': fixing the rotor support segments 20 of two or more pre-assembled modules 100 to the rotating shaft 42 in the circumferential direction, so that the rotor support 2 sleeves on the outer peripheral side of the stator 1, or the stator 1 sleeves on the outer peripheral side of the rotor support 2.

in which taking the rotating shaft 42 sleeving on the outer peripheral side of the fixing shaft 41 as an example, the second outer flange plate 421 is arranged at the outer circumference of the rotating shaft 42, and two or more rotor support segments 20 are fixed to the second outer flange plate 421 in the circumferential direction to form the complete rotor support 2.

In addition, since there may be the gap between two adjacent rotor support segments 20 or between two adjacent stator segments 10 in the circumferential direction due to assembly errors, the elastic sealing member, such as the O-shaped ring sealing member or the like, can be placed in the gap.

Figure 6:
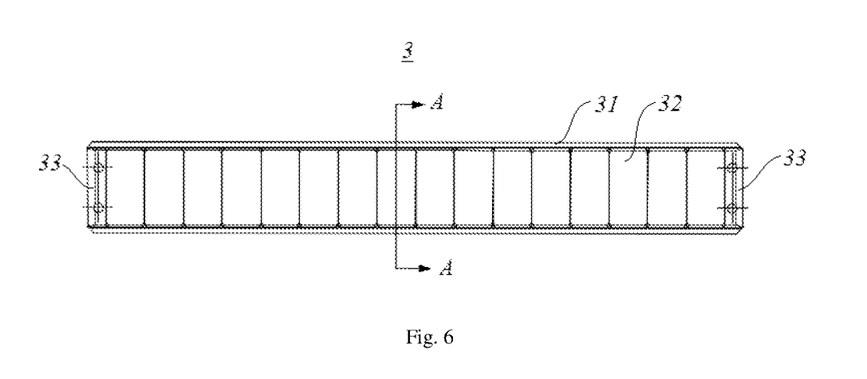
FIG. 6 shows a schematic structural view of a magnetic pole module in the large-diameter electric motor shown in FIG. 2.
Figure 7:
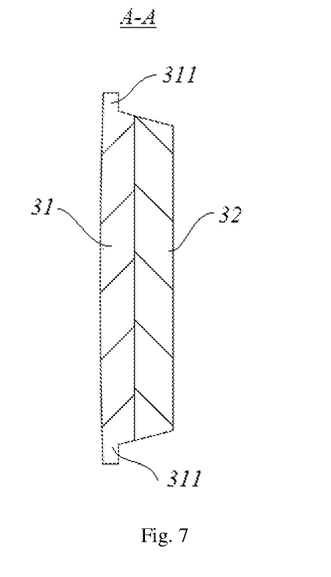
FIG. 7 shows a schematic structural view of the magnetic pole module shown in FIG. 6 in a direction A-A.
Figure 8:
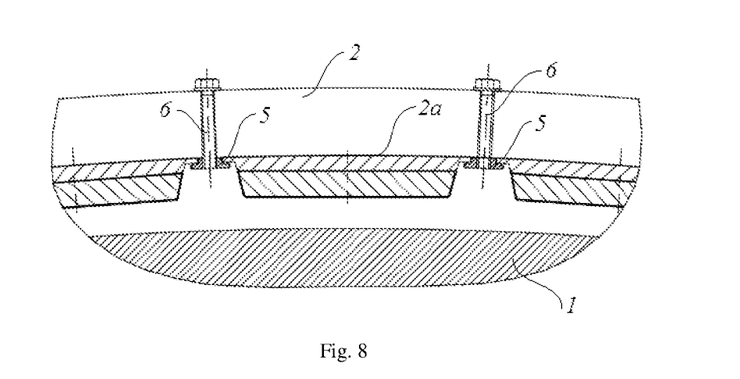
FIG. 8 shows an assembling effect schematic view of the magnetic pole module and a rotor support shown in FIG. 6.

Referring to FIG. 6 to FIG. 8, FIGS. 6-8 show structural schematic views of the magnetic pole modules 3 and effect views of the magnetic pole modules 3 assembling to the mounting surface 2a of the rotor support 2.

The magnetic pole modules 3 serve as an excitation source of the electric motor, and a direct current coil excitation or a permanent magnetic excitation is commonly used. Take the permanent magnetic excitation as an example, each of the magnetic pole modules 3 generally includes a base plate 31 and a plurality of magnetic steels 32 sequentially arranged on the base plate 31 in a length direction of the base plate 31; the plurality of magnetic steels 32 are bonded to the base plate 31 by a structural glue, or connected to the base plate 31 by means of a screwing or the like. In order to prevent the plurality of magnetic steels 32 from moving in the length direction of the base plate 31, flow-guiding strips 33 are also respectively arranged at two ends of the base plate 31 in the length direction of its own. The magnetic pole modules 3 can be pre-manufactured at the processing site.

The base plate 31 can be made of a magnetic conductive material, such as low carbon steel, silicon steel or the like; the magnetic steel 32 is made of a hard magnetic material, such as a ferrite permanent magnetic materials or the like; and the flow-guiding strip 33 is made of a weak magnetic conductive material, such as stainless steel, fiber reinforced polymer/plastic (FRP) or the like. The flow-guiding strip 33 is fixed on the base plate 31 by a non-magnetic fastening member. On the one hand, the base plate 31 provides support for the plurality of magnetic steels 32, on the other hand, provides a magnetic path for adjacent magnetic pole modules 3.

A surface of each of the magnetic pole modules 3 is generally wrapped with a glass fiber cloth first, and then is embeddingly encapsulated, so that the magnetic pole modules 3 can be isolated from the outside air and the risk of failure can be reduced. Connecting portions 311 are arranged at two sides of the base plate 31 in the circumferential direction of the rotor support 2, and the entire magnetic pole modules 3 can move along mounting rails formed between two adjacent pressing strips 5 through the connecting portions 311.

As described above, the electric motor can be the structure with the inner stator and the outer rotor, that is, the rotor is arranged along the outer circumference of the stator 1, and the mounting surface 2a of the rotor support 2 is an inner circumference face of the rotor support 2; the electric motor can also be the structure with the inner rotor and the outer stator, that is, the stator 1 is arranged along the outer circumference of the rotor, and the mounting surface 2a of the rotor support 2 is an outer peripheral face of the rotor support 2, so that the magnetic pole modules 3 are arranged opposite to the stator 1.

As shown in FIG. 8, taking the electric motor having the structure with the inner stator and the outer rotor as an example, the pressing strips 5 made of the weak magnetic conductive material is connected to the inner circumferential face of the rotor support 2, that is, the mounting surface 2a, through a stainless steel fastening member.

Therefore, in the assembling step S3, assembling the plurality of magnetic pole modules 3 to the mounting surface 2a of the rotor support 2 through the predetermined gap includes step S31: pre-arranging a plurality of pressing strips 5 on the mounting surface 2a of the rotor support 2, so that each of the mounting rails is formed between each two adjacent pressing strips 5;

step S32: placing the plurality of magnetic pole modules 3 on the mounting rails respectively, in which each of the magnetic pole modules 3 includes the base plate 31 and a plurality of magnetic steels 32 arranged on the base plate 31, the connecting portions 311 are arranged at two sides of the base plate 31 in the circumferential direction of the rotor support 2, and the base plate 31 is placed and attached on the mounting surface 2a; and step S33: pressing the pressing strips 5 on the adjacent magnetic pole modules 3 and fixing the pressing strips 5 on the mounting surface 2a, in which, for example, the pressing strips 5 can be pressed onto the connecting portions 311 of the adjacent magnetic pole modules 3.

Figure 9:
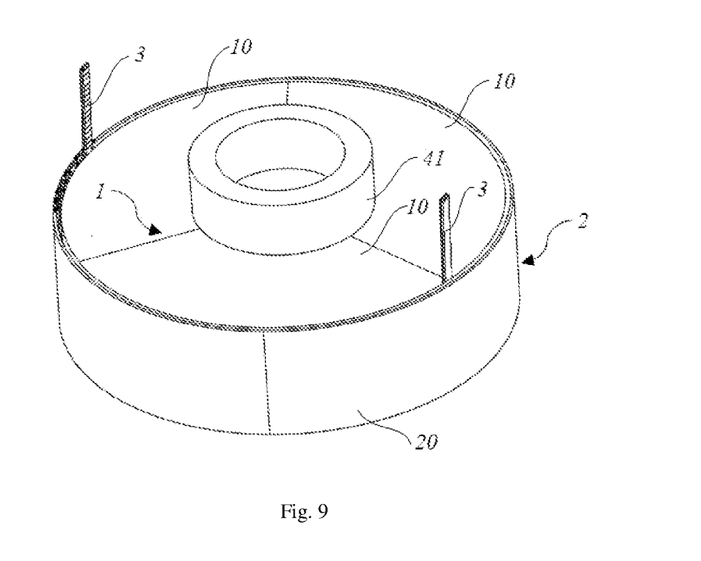
FIG. 9 shows an assembling effect schematic view of an assembling process of a magnetic pole module and a rotor support of a large-diameter electric motor according to an embodiment of the present disclosure.

Further, in order to avoid an abnormal deformation of the rotor caused by the non-uniform magnetic pulling force, in the step S32, the placing the plurality of magnetic pole modules 3 on the mounting rails respectively includes placing the plurality of the magnetic pole modules 3 on first mounting rails and second mounting rails in sequence, respectively, in which the mounting rails includes a plurality of first mounting rails distributed at 180° in the circumferential direction of the rotor support and a plurality of second mounting rails distributed at the other 180° in the circumferential direction of the rotor support 2.

As a result, the magnetic pulling force between the magnetic pole modules 3 of the rotor and the stator 1 always keeps balance in the radial direction, so that it can further improve the convenience of assembling the large-diameter electric motor.

Further, the method for assembling the large-diameter electric motor provided by the embodiments of the present disclosure further includes step S34: providing the fastening member 6, adjusting a radial distance between the pressing strips 5 and the mounting surface 2a by the fastening member 6, and fixing the pressing strips 5 to the mounting surface 2a by the fastening member 6.

Before the magnetic pole modules 3 are inserted into the mounting rails, it can be ensured that there is the gap between the pressing strips 5 and the mounting surface 2a by mean of loosening the fastening member 6, so as to facilitate inserting the magnetic pole modules 3.

Those skilled in the art should understand that the above-mentioned embodiments are all illustrative and not limited. Different technical features appearing in different embodiments can be combined to achieve beneficial effects. Those skilled in the art should be able to understand and implement other modified embodiments of the disclosed embodiments on the basis of studying the drawings, description, and claims. In the claims, the term "comprising" does not exclude other means or steps; when an article is not modified with a quantitative word, it is intended to include one/kind or multiple/kind of articles, and can be used interchangeably with "one/kind or multiple/kind of articles; the terms "first" and "second" are used to denote names rather than to indicate any specific order. Any reference signs in the claims should not be understood as limiting the scope of protection. The functions of multiple parts appearing in the claims can be implemented by a single hardware or software module. The appearance of certain technical features in different dependent claims does not mean that these technical features cannot be combined to achieve beneficial effects.

What is claimed is:

1. A method for assembling a large-diameter electric motor, comprising
    a preparing step: providing two or more stator segments for forming a stator and two or more rotor support segments for forming a rotor support;
    a splicing step: splicing the two or more stator segments and the two or more rotor support segments in a predetermined manner to form the stator and the rotor support that are coaxially assembled, respectively, and maintaining a predetermined gap between the stator and the rotor support in a radial direction; and
    an assembling step: inserting a plurality of magnetic pole modules into the predetermined gap, and assembling the plurality of magnetic pole modules to a mounting surface of the rotor support;
    wherein the assembling step comprises
    pre-arranging a plurality of pressing strips on the mounting surface of the rotor support, so that each of mounting rails is formed between each two adjacent pressing strips;
    placing the plurality of magnetic pole modules on the mounting rails respectively; and
    pressing the pressing strips on the adjacent magnetic pole modules and fixing the pressing strips on the mounting surface;
    the placing the plurality of magnetic pole modules on the mounting rails respectively comprises
    placing the plurality of the magnetic pole modules on first mounting rails and second mounting rails in sequence, respectively, and the mounting rails comprising a plurality of first mounting rails and a plurality of second mounting rails respectively distributed at 180° in the circumferential direction of the rotor support.

2. The method according to claim 1, wherein the splicing step comprises
    assembling the two or more stator segments in a circumferential direction into the complete stator;
    assembling the two or more rotor support segments in the circumferential direction into the complete rotor support; and
    assembling the stator and the rotor support coaxially.

3. The method according to claim 1, wherein the assembling the stator and the rotor support coaxially comprises
    providing a main shaft, comprising a fixing shaft and a rotating shaft that are arranged coaxially, and a bearing arranged between the fixing shaft and the rotating shaft;
    fixing the stator to the fixing shaft; and
    fixing the rotor support to the rotating shaft so that the rotor support sleeves on an outer peripheral side of the stator, or the stator sleeves on an outer peripheral side of the rotor support.

4. The method according to claim 2, wherein the method further comprises
    dividing the stator into two or more stator segments in the circumferential direction; and
    dividing the rotor support into two or more rotor support segments in the circumferential direction.

5. The method according to claim 1, wherein the splicing step comprises
    coaxially assembling the stator segments and the rotor support segments into pre-assembled modules through fixing members, wherein the predetermined gap is maintained in the radial direction between the stator segments and the rotor support segments in the pre-assembled modules;
    assembling two or more pre-assembled modules in a circumferential direction to form the stator and the rotor support that are coaxially assembled; and
    removing the fixing members in the pre-assembled modules.

6. The method according to claim 5, wherein the assembling two or more pre-assembled modules in the circumferential direction comprises
    providing a main shaft, comprising a fixing shaft and a rotating shaft that are arranged coaxially, and a bearing arranged between the fixing shaft and the rotating shaft;
    fixing the stator segments of the two or more pre-assembled modules to the fixing shaft in the circumferential direction; and
    fixing the rotor support segments of the two or more pre-assembled modules to the rotating shaft in the circumferential direction so that the rotor support sleeves on an outer peripheral side of the stator, or the stator sleeves on an outer peripheral side of the rotor support.

7. The method according to claim 5, wherein the method further comprises
    dividing the stator into two or more stator segments in the circumferential direction;
    dividing the rotor support into two or more rotor support segments in the circumferential direction; and
    coaxially assembling the stator segments and the rotor support segments into the pre-assembled modules.

8. The method according to claim 7, wherein the number of the stator segments is the same as the number of the rotor support segments.

9. The method according to claim 1, wherein the method further comprises
    providing a fastening member, adjusting a radial distance between the pressing strips and the mounting surface by the fastening member, and fixing the pressing strips to the mounting surface by the fastening member.

* * * * *